United States Patent
Khorshid (10) Patent No.: US 7,945,973 B2
(45) Date of Patent: May 24, 2011

(54) FLUID CONTROL SYSTEM, DEVICE AND METHOD

(75) Inventor: Obalit Khorshid, Winnetka, CA (US)

(73) Assignee: Obalit Khorshid, Winnetka, CA (US)

( * ) Notice: Subject to any disclaimer, the term of this patent is extended or adjusted under 35 U.S.C. 154(b) by 1011 days.

(21) Appl. No.: 11/784,437

(22) Filed: Apr. 6, 2007

(65) Prior Publication Data

US 2007/0284552 A1 Dec. 13, 2007

Related U.S. Application Data

(60) Provisional application No. 60/789,771, filed on Apr. 6, 2006.

(51) Int. Cl.
*F16K 31/02* (2006.01)

(52) U.S. Cl. .............. 4/623; 251/129.04; 290/43; 290/54

(58) Field of Classification Search .............. 251/129.04; 290/43, 54; 4/623
See application file for complete search history.

(56) References Cited

U.S. PATENT DOCUMENTS

| | | | |
|---|---|---|---|
| 2,168,921 A * | 8/1939 | Graybrook et al. ......... | 290/38 B |
| 2,874,309 A * | 2/1959 | Staak .......................... | 290/38 A |
| 4,179,007 A * | 12/1979 | Howe .............................. | 180/2.2 |
| 4,520,516 A * | 6/1985 | Parsons ............................... | 4/623 |
| 4,731,545 A * | 3/1988 | Lerner et al. .................... | 290/54 |
| 4,746,808 A * | 5/1988 | Kaeser .............................. | 290/52 |
| 4,838,310 A * | 6/1989 | Scott et al. ................ | 137/624.14 |
| 4,839,039 A * | 6/1989 | Parsons et al. ............ | 251/129.04 |
| 4,963,870 A * | 10/1990 | Obinata ........................ | 341/118 |
| 5,140,254 A * | 8/1992 | Katzman ......................... | 322/35 |
| 5,226,629 A * | 7/1993 | Millman et al. ......... | 251/129.04 |
| 5,249,631 A * | 10/1993 | Ferren .............................. | 169/52 |
| 5,251,815 A * | 10/1993 | Foye ............................ | 236/49.3 |
| 5,427,350 A * | 6/1995 | Rinkewich ................ | 251/30.01 |
| 6,369,532 B2 * | 4/2002 | Koenen et al. ................ | 318/150 |
| 6,392,311 B2 * | 5/2002 | Inaba et al. ................. | 290/38 R |
| 6,420,437 B1 * | 7/2002 | Mori et al. ...................... | 516/90 |
| 6,481,634 B1 * | 11/2002 | Zosimadis ................. | 236/12.12 |
| 6,509,652 B2 * | 1/2003 | Yumita ............................ | 290/54 |
| 6,798,080 B1 * | 9/2004 | Baarman et al. ................ | 290/54 |
| 6,995,477 B2 * | 2/2006 | Fan ................................ | 290/1 A |
| 7,121,495 B2 * | 10/2006 | Caamano .................... | 242/390.5 |
| 7,608,936 B2 | 10/2009 | Shimizu et al. ................. | 290/43 |

* cited by examiner

*Primary Examiner* — John Bastianelli
(74) *Attorney, Agent, or Firm* — James A. Gavney, Jr.; JAG Patent Services LLC (57) ABSTRACT

A fluid control system, device and method are disclosed. The fluid control device is preferably configured to connect to an outlet of a fluid source. The fluid control device includes a valve, a sensor, a battery and a micro-generator. The sensor is used to measure or detect a condition and provide output signals that open and close the valve in response to a measured or detected condition. The micro-generator is positioned in a flow path of fluid and generates power from a flow of the fluid. The power generated from the micro-generator is stored in the battery and used to power later operations of the device. The device can be used for automating faucets, sprinklers and fire extinguishing equipment.

8 Claims, 6 Drawing Sheets

FLUID CONTROL SYSTEM, DEVICE AND METHOD

RELATED APPLICATIONS

This Application claims priority under 35 U.S.C. §119(e) from the U.S. Provisional Patent Application Ser. No. 60/789,771, filed on Apr. 6, 2006, and titled "MICRO-GENERATOR CONTROL SYSTEMS," the contents of which are hereby incorporated by reference.

FIELD OF THE INVENTION

This invention relates generally to control systems, devices and methods. More specifically, this invention relates to fluid control systems, devices and methods.

BACKGROUND OF THE INVENTION

A fluid control device, such as a fluid control device that automatically opens and closes a faucet in response to an infrared occupancy sensor, typically requires wiring and circuitry to be installed. These prior art fluid control devices can in general only be installed with new construction and are difficult to retrofit to existing plumbing and faucets.

The U.S. Pat. No. 6,420,737 describes a fluid control device that can be adapted to an existing faucet. This device, however, is bulky and requires a large battery to maintain and operate it. Further, this device has limited applications and can only be used for controlling a flow of water through a faucet.

What is needed is a fluid control system, device or method that can be used for a large number of applications. Preferably, the system, device and method can be used to control a flow of water from faucets, sprinklers, fire extinguishing equipment and the like. In a particular embodiment of the invention, the system or device is configured to retrofit to an outlet portion of an existing faucet and control a flow of water therefrom.

SUMMARY OF THE INVENTION

The present invention is directed to a fluid control system, fluid control device and fluid control method. A fluid control device in accordance with the present invention includes a fluid control unit with a sensor unit for sensing a condition. The sensor unit includes a sensor that is photo sensor, a thermal sensor, an electrode, a moisture sensor or an occupancy sensor for detecting or measuring light, temperature, chemical compositions, water or moisture levels or the presence of an object or body, respectively. The fluid control unit also includes a valve unit that is coupled to the sensor unit. The valve unit preferably opens and closes in response to output signals generated by the sensor unit that are based on the detected or measured condition.

The fluid control unit also includes a power generator unit for powering one or both of the sensor unit and the valve unit. Preferably, the power generator unit includes a magnetic micro-generator that generates power from a flow of the fluid through the fluid control unit. The power generator unit preferably also includes a power storage unit or battery, whereby the power that is generated from the magnetic micro-generator is stored in the power storage unit or the battery and is used to power further operations of the fluid control unit.

In accordance with the embodiments of the invention, the magnetic micro-generator includes a magnetic core and a magnetic flywheel. In operation, the fluid control unit is coupled to the fluid source, such that the magnetic flywheel spins as the fluid flows through the fluid control unit and thus generates the power that is stored in the power storage unit or battery. Preferably, the power that is stored in the power storage unit or battery is used to operate and power the sensor unit, the valve unit or both.

The fluid control unit preferably further includes means to couple the fluid control unit to the fluid source. The means to couple the fluid control unit to the fluid source can include one or more threaded features, pipe fittings or any other suitable feature or mechanism that allows the fluid control unit to couple to and be positioned in a fluid flow path from the fluid source. In accordance with an embodiment of the invention, the fluid control unit includes a threaded feature configured to thread onto an end spout of a faucet. In accordance with this embodiment, the fluid control unit includes an occupancy sensor that automatically opens and closes the valve unit to control the flow of water based on the detection of a person in the vicinity of the fluid control unit. Specifically, the valve unit is opened to allow the flow of water through the faucet and the fluid control unit when a person is detected by the occupancy sensor to be in front of the faucet and the fluid control unit, and the valve unit is closed to stop or prevent the flow of water through the faucet and the fluid control unit when a person is not detected by the occupancy sensor to be in front of the faucet and the fluid control unit.

In accordance with the method of the present invention, a flow of a fluid from a fluid source is controlled by measuring a condition of an environment around the fluid or a condition of the fluid itself using a sensor unit, such as described above. Based on the measured condition, a valve is automatically opened and closed, thus controlling a flow of the fluid through a valve. As described above, the measured condition can be the presence of a person, wherein the valve is opened to allow water to flow when the presence of the person is detected and the valve is closed to stop or prevent the flow of water when the presence of the person is not detected. Using the flow of the fluid or a fluid stream, power is generated using a power generator unit with a micro-generator having a magnetic flywheel that is positioned in the fluid stream. Power generated from the micro-generator is stored in a power storage unit or battery and is used to operate and power the valve and/or operate and power the sensor. In will be clear to one skilled in the art from the discussions above and below that the present invention has a number of applications including, but not limited to, sprinkler systems for watering gardens and extinguishing fires.

In accordance with the embodiments of the invention, a system includes a plurality of fluid control units, similar to the fluid control unit described above. Each of the fluid control units can be located at and coupled to sprinkler outlets extending from a common water source. Each of the fluid control units preferably includes a valve that is in communication with the at least one sensor. The fluid control units also each preferably include a power source such as a micro-generator and power storage unit for powering the valve and/or the at least one sensor. The fluid control units also include means for securing the fluid control units to the sprinkler outlets with portions of the micro-generators and valves in flow paths of the common fluid source.

In operation, the at least one sensor measures or detects a condition. Based on the measured or detected condition, the at least one sensor instructs the valves of the fluid control units when to open and close, thus initiating the flow of the fluid and stopping the flow of the fluid through the fluid control units, respectively. Where the system is a garden sprinkler system, the sensor can, for example, measure or detect moisture in surrounding soil. When the level of moisture measured or detected by the sensor is below a threshold value, the sensor instructs the valves of the fluid control units to open for a duration of time to water the garden and increase the moisture level in the soil. After the duration of time, or when the measured or detected moisture level is above a threshold level, the sensor instructs the valves of the fluid control units to close, thus stopping the flow of water through the fluid control units.

As the water flows through the fluid control unit, the micro-generators generate power from the flow of the water through the fluid control units. The power that is generated is stored in a power storage unit and is used to operate or power the valves and/or the at least one sensor, such as described above.

The system can include a plurality of micro-processors with firmware and/or a central computer with a graphical user interface to program the system to operate according to any number of parameters. For example, where the system is a garden sprinkler, a central computer can be used to program the duration of time that the water flows through the fluid control units when the moisture level measured or detected is below the threshold value, as well as program the moisture threshold value itself. The plurality of micro-processors and/or a central computer can be used to program and operate the system in any number of ways. The system can also include a memory unit to store data and monitor the operation of the system and/or the conditions of the surrounding environment.

DETAILED DESCRIPTION OF THE INVENTION

Figure 1:
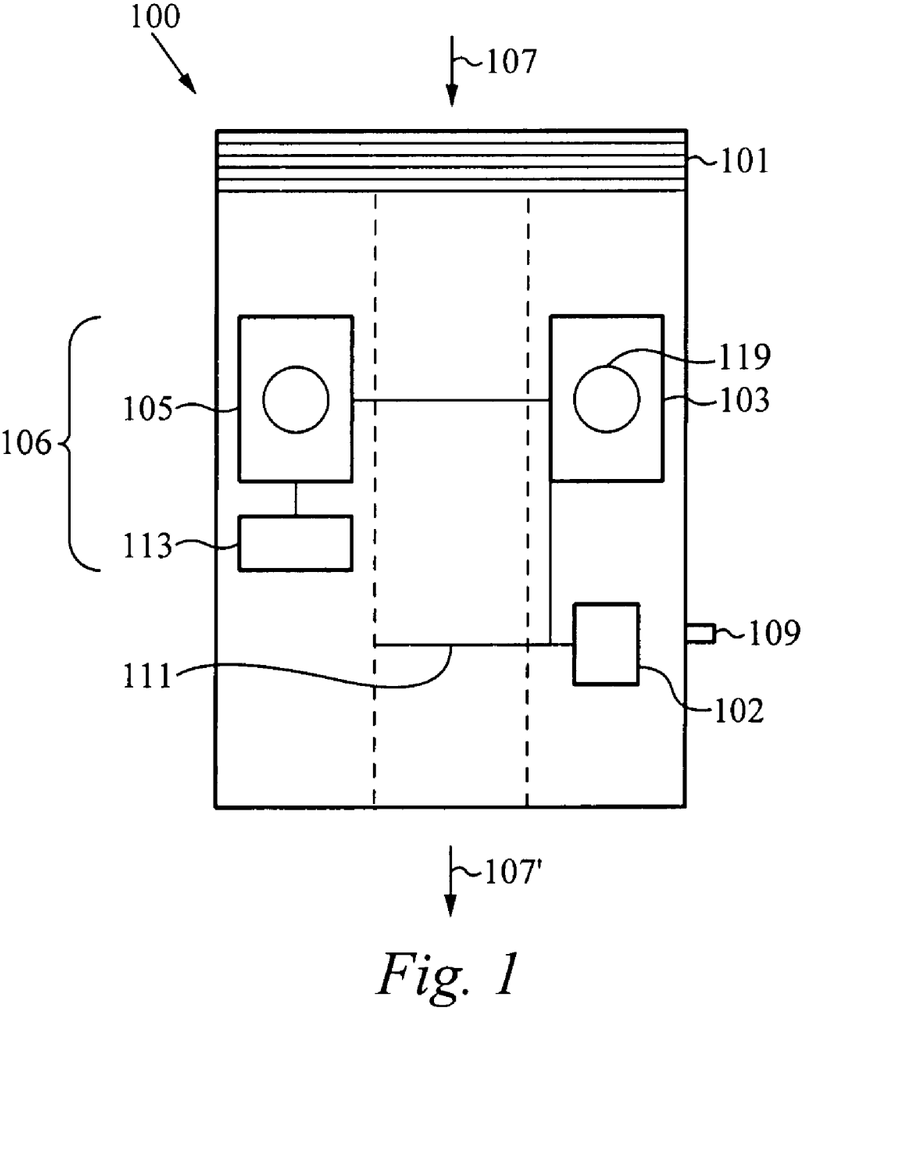
FIG. 1 illustrates a schematic representation of a fluid control unit, in accordance with the embodiments of the invention.

FIG. 1 illustrates a schematic representation of a fluid control unit 100, in accordance with the embodiments of the invention. The fluid control unit 100 includes means 101 to couple the fluid control unit 100 to a fluid source (not shown). The means 101 to couple the fluid control unit 100 to a fluid source can include one or more threaded features, pipe fittings or any other suitable features or mechanisms that allow the fluid control unit 100 to couple to the fluid source and be positioned in a path of a flow of fluid, as indicated by the arrows 107 and 107'.

The fluid control unit 100 in includes a sensor unit 103 for sensing a condition. The sensor unit 103 includes a sensor 119 that is photo sensor, a thermal sensor, an electrode, a moisture sensor or an occupancy sensor for detecting or measuring light, temperature, chemical compositions, water or moisture levels or the presence of an object or body, respectively. The fluid control unit 100 further includes a valve unit 111 that is coupled to the sensor unit 103. The valve unit 111 preferably opens and closes in response to output signals generated by the sensor unit 103 that are based on the measured or detected condition. The valve unit 111 can include any mechanism including, but not limited to, a solenoid or motor for mechanically opening and closing a valve.

The fluid control unit 100 also includes a power generator unit 106 for powering one or both of the sensor unit 103 and the valve unit 111. Preferably, the power generator unit 106 includes a magnetic micro-generator 105 that generates power from a flow of the fluid, as indicated by the arrows 107 and 107', through the fluid control unit 100. The power generator unit 106 preferably also includes a power storage unit or battery 1113, whereby power that is generated from the magnetic micro-generator 105 is stored in the power storage unit or the battery 113 and is used to power further operations of the fluid control unit 100.

Figure 3A:
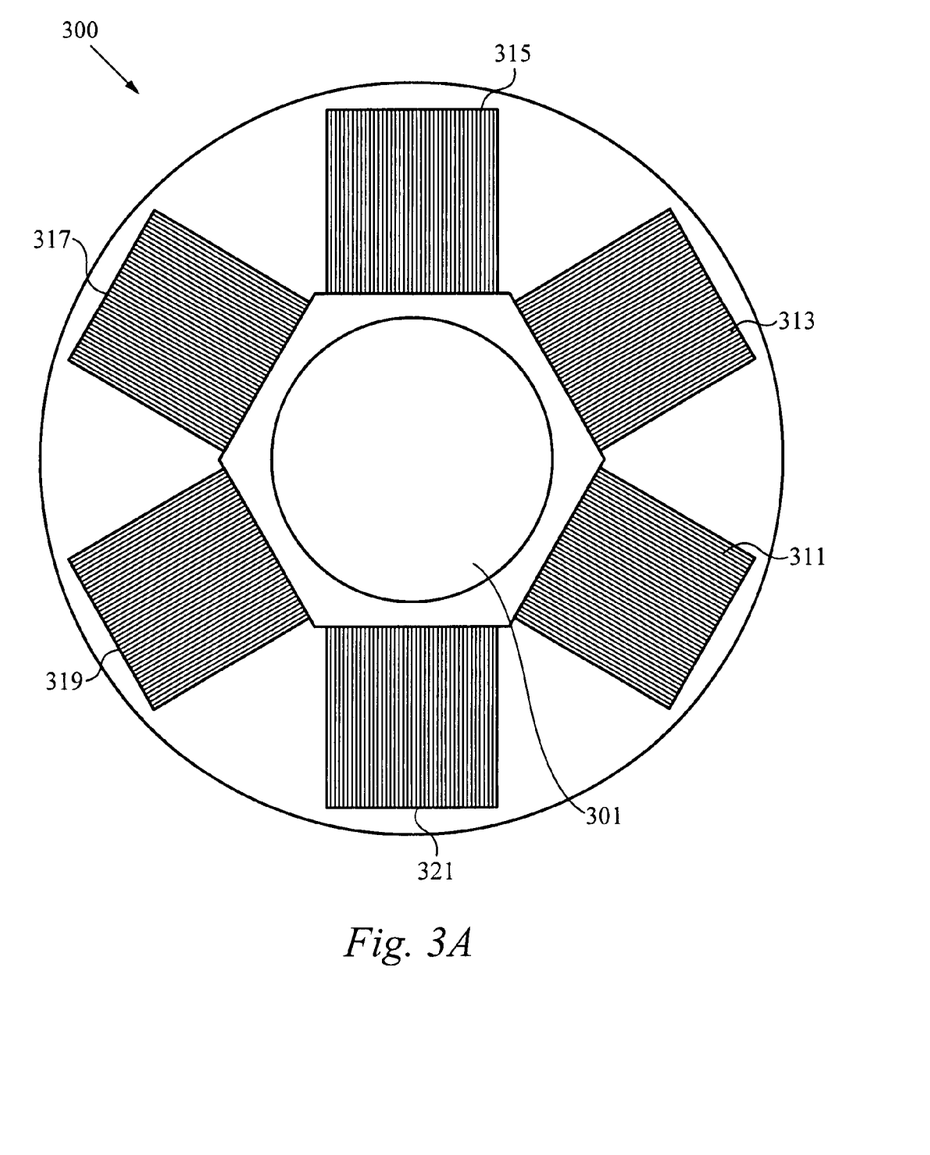
FIG. 3A illustrates a portion of a magnetic fly-wheel used in a micro-generator to generate power from a fluid stream, in accordance with the embodiments of the invention.
Figure 3B:
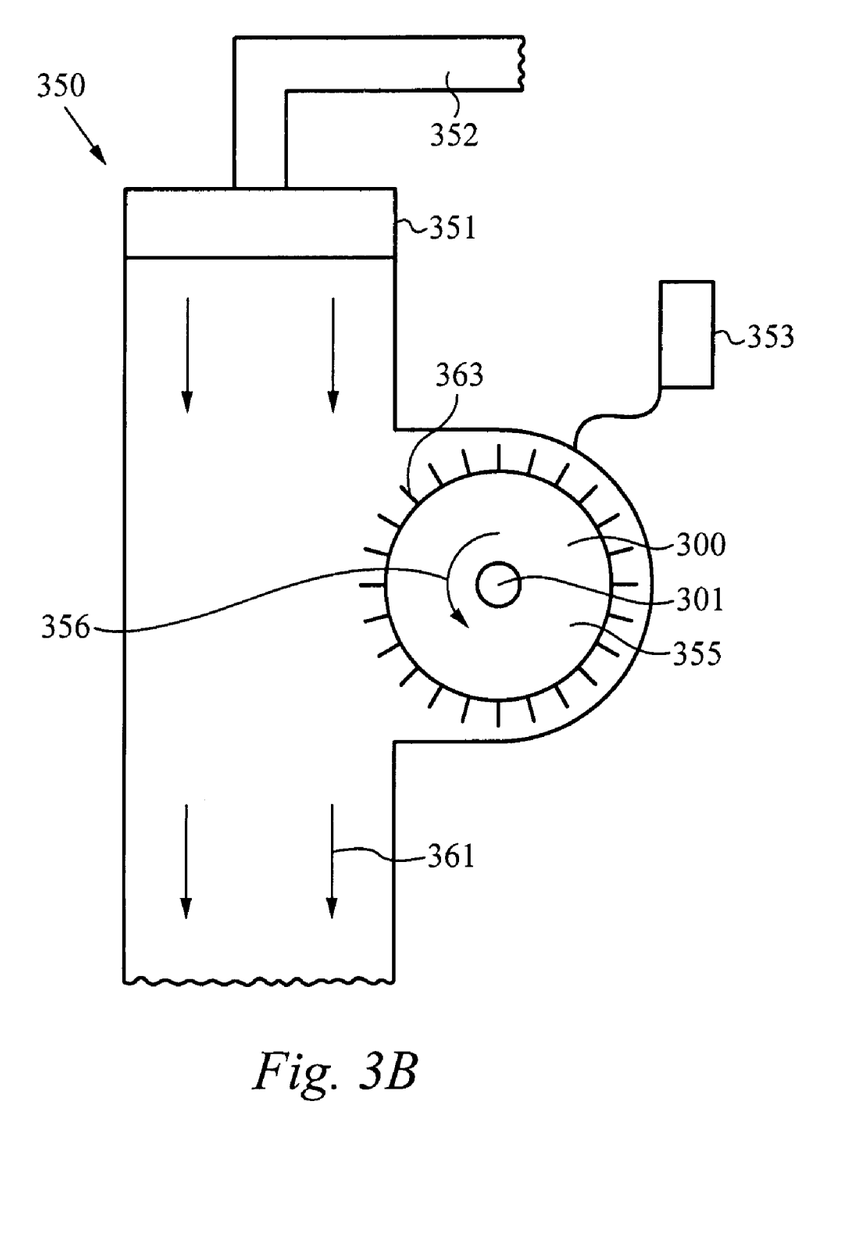
FIG. 3B illustrates a micro-generator with a magnetic fly-wheel positioned in a fluid stream, in accordance with the embodiments of the invention.

Referring now FIGS. 3A-B, the magnetic micro-generator 100 (FIG. 1) includes a magnetic core 301 and a magnetic flywheel 300 that has a plurality of micro-magnets 311, 313, 315, 317, 319 and 321 positioned in a circular arrangement on the magnetic flywheel 300. In operation, a fluid control unit 350 is coupled to the fluid source 352 through suitable attachment features 351. The fluid control unit 350 is coupled to the fluid source 352 such that the magnetic flywheel 300 spins, as indicated by the arrow 356, when fluid 361 flows through the fluid control unit 350 and thus generates the power that is stored in a power storage unit or battery 353. Preferably, the power that is stored in the power storage unit or battery 353 is used to operate and power a sensor unit 103, a valve unit 111 or both, such as shown in FIG. 1. Preferably, the magnetic flywheel 300 is equipped with micro-structures or paddles 363 that help to spin the magnet flywheel 300 in the direction 356 as the fluid 361 flows past the magnetic flywheel 300.

Figure 2:
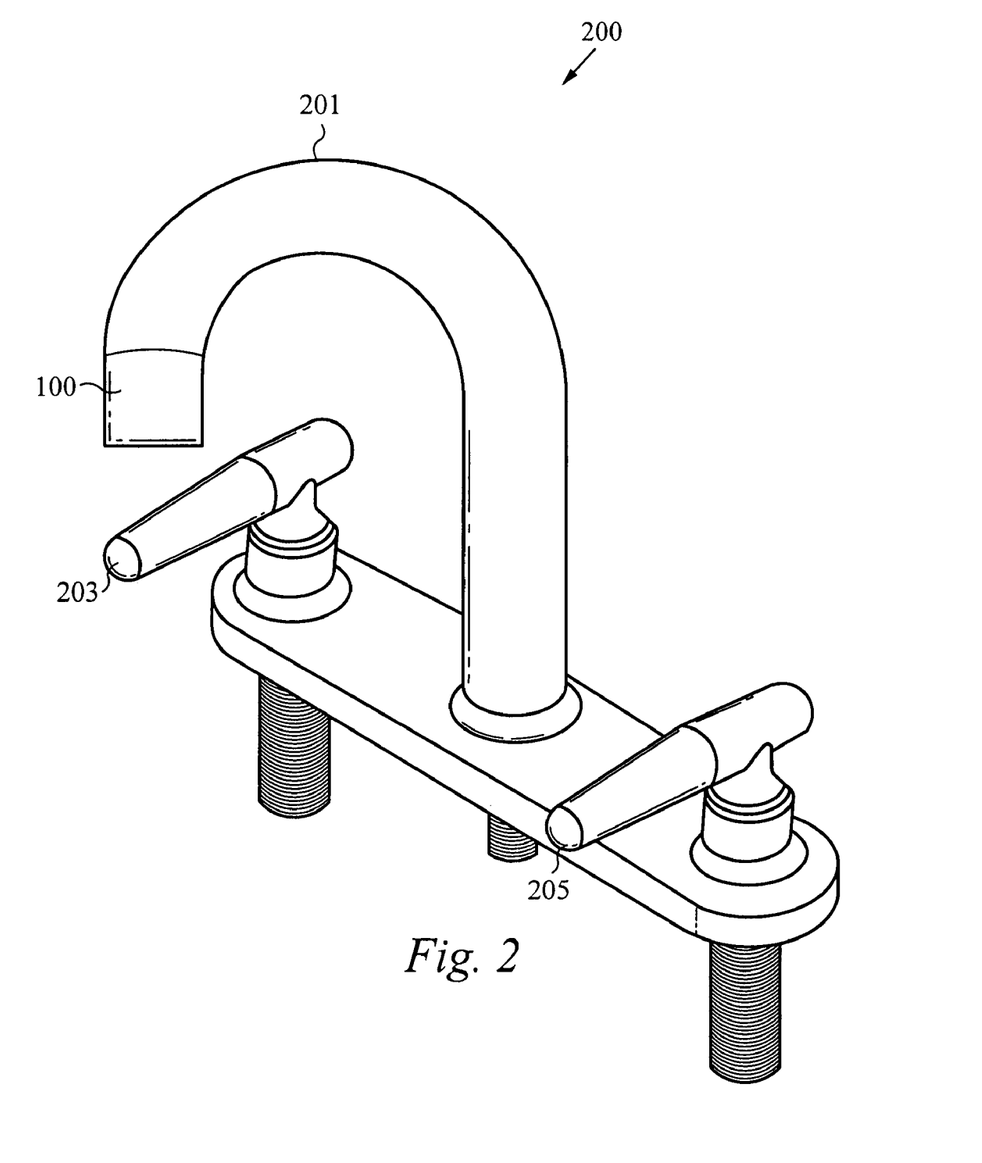
FIG. 2 illustrates a fluid control unit attached to an outlet portion of a faucet, in accordance with the embodiments of the invention.

Referring now to FIG. 1 and FIG. 2. In accordance with this embodiment a fluid control unit 100 is configured to couple to the end spout 201 of a faucet 200 through a suitable attachment means 101. The hot water handle 203 and the cold water handle 205 are adjusted to provide a preferred temperature of water to the end spout 201 of the faucet 200 and the fluid control unit 100. The fluid control unit 100 includes an occupancy sensor 119 that automatically opens and closes the valve unit 111 to control the flow of water 107 and 107' based on the detection of a person in the vicinity of the fluid control unit 100. Specifically, the valve unit 111 is opened to allow the flow of water through the faucet 200 and fluid control unit 100 when a person is detected by the occupancy sensor 119 to be in front of the faucet 200 and fluid control unit 100, and the valve unit 111 is closed to stop or prevent the flow of water 107 and 107' through the faucet 200 and fluid control unit 100 when a person is not detected by the occupancy sensor 119 to be in front of the faucet 200 and fluid control unit 100. In accordance with the embodiments of the invention, the fluid control unit 100 also includes a manual override switch 109, which can be used to manually open the valve unit 111. Accordingly, with the override switch 109 activated, the valve unit 111 is opened and the faucet 200 operates as a standard manual faucet through the hot water handle 203 and the cold water handle 205. The fluid control unit 100 can also include a micro-processor 102 with firmware and a user interface (not shown) that allows a user to program or select a mode of operation for the fluid control unit 100.

Figure 4:
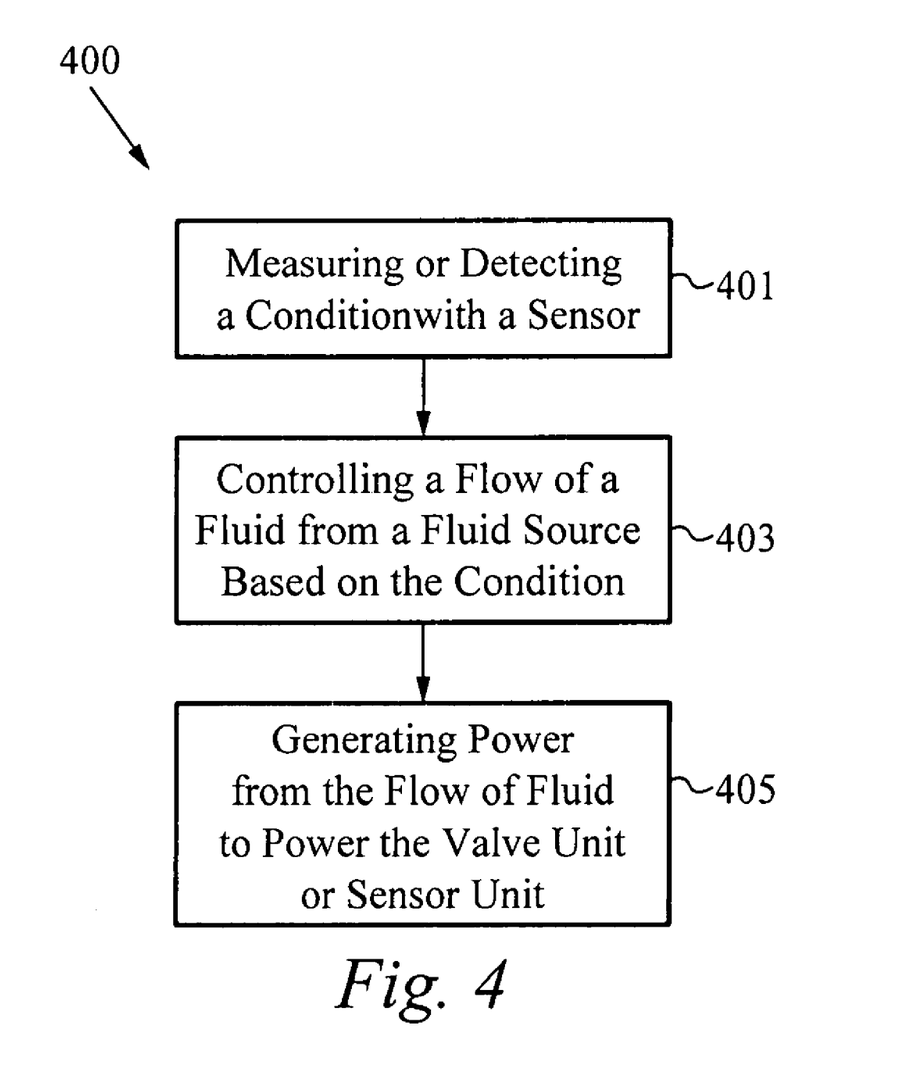
FIG. 4 shows a block-flow diagram outlining steps for controlling a fluid flow, in accordance with the method of the present invention.

FIG. 4 shows a block-flow diagram 400 outlining steps for controlling a flow of fluid, in accordance with a method of the invention. Preferably, a flow of a fluid from a fluid source, such as described above, is controlled by measuring or detecting a condition of the environment around the fluid of the fluid itself in the step 401 using, for example, the sensor unit 103 (FIG. 1). Based on the measured or detected condition in the step 401, in the step 403 a flow of the fluid from the fluid source is controlled. For example a valve unit 111 (FIG. 1) is automatically opened and closed. As described above, the condition that is measured or detected in the step 401 can be the presence of a person, wherein the valve unit 111 is opened to allow water to flow when the presence of the person is detected and the valve unit 111 is closed to stop or prevent the flow of water when the presence of the person is not detected. As a flow of fluid is controlled in the step 403, in the step 405 power is generated from the flow of the fluid, which can be stored and used to power later operations of the valve unit 111 and/or the sensor unit 103. The power generated in the step 403 can be generated using a power generator unit 106 with a micro-generator 105 having a magnetic flywheel 300 (FIGS. 3A-B) positioned in a fluid stream. It will be clear to one skilled in the art that one fluid control unit can be used to control the flow of a fluid through more than one fluid outlet coupled to a common fluid source.

Referring to FIG. 4, in accordance with the embodiments of the invention, a system 500 includes a plurality of fluid control units 551, 553, 555, 557, 559, 561, 563, 565 and 567, similar to the fluid control unit 100 described above with reference to FIGS. 1, 2 and 3A-B. Each of the fluid control units 551, 553, 555, 557, 559, 561, 563, 565 and 567 can correspond to sprinkler outlets from a common water source 550. Each of the fluid control units 551, 553, 555, 557, 559, 561, 563, 565 and 567 preferably includes a valve unit 111 (FIG. 1) that is in communication with the at least one sensor unit 501. The fluid control units 551, 553, 555, 557, 559, 561, 563, 565 and 567 also each preferably includes a power source 106 that includes a micro-generator 105 and a power storage unit 113 (FIG. 1) for powering the valve units 111 (FIG. 1) and/or the at least one sensor 501. The fluid control units 551, 553, 555, 557, 559, 561, 563, 565 and 567 also include means for securing the fluid control units 551, 553, 555, 557, 559, 561, 563, 565 and 567 to the sprinkler outlets with portions of the micro-generators 105 and valves units 111 in flow paths of the common fluid source 550.

Figure 5:
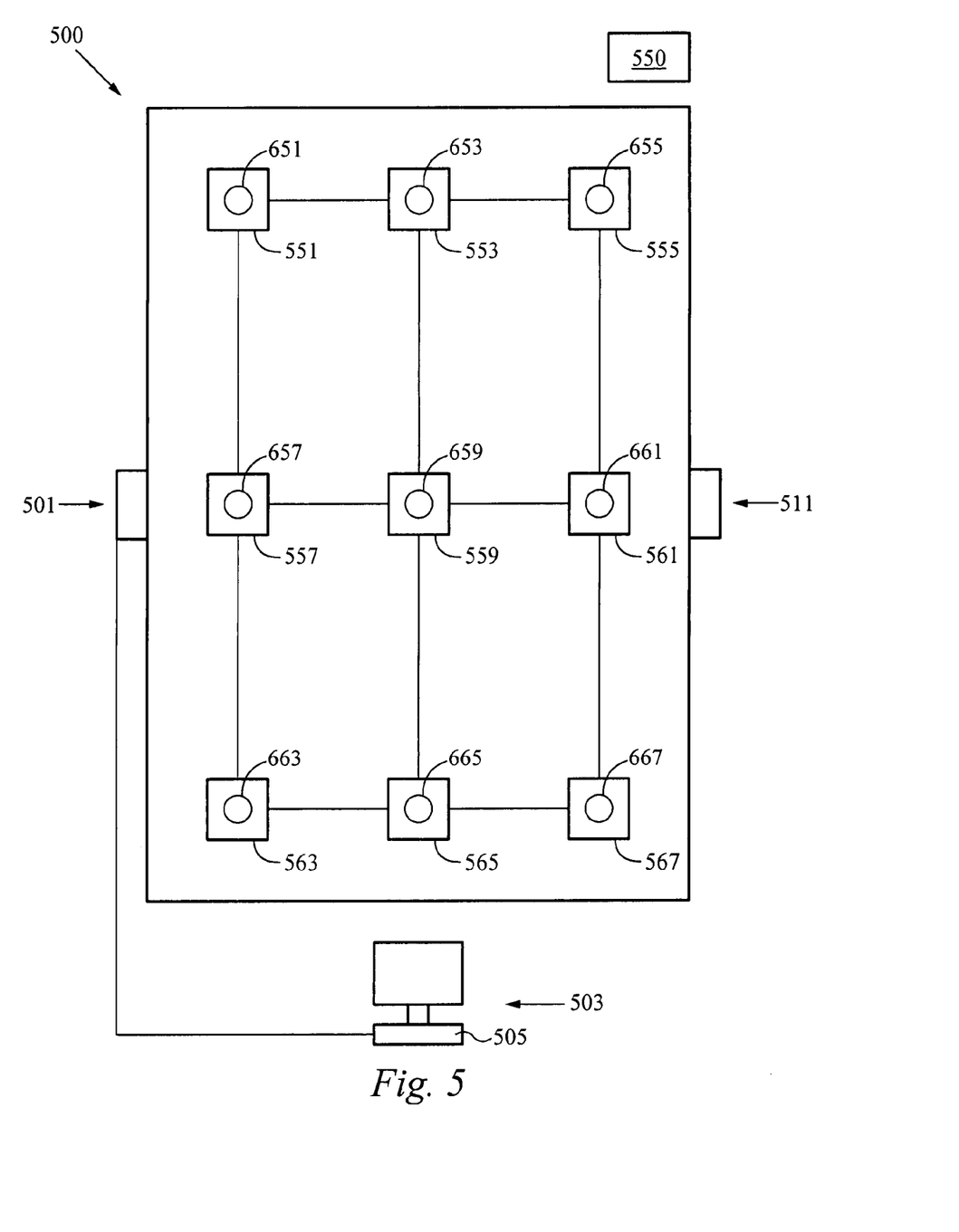
FIG. 5 illustrates a system with a plurality of fluid control units, in accordance with the embodiments of the invention.

In operation, the at least one sensor unit 501 measures or detects a condition. Based on the measured or detected condition, the at least one sensor unit 501 provides output signals that instruct the valve units on each of the fluid control units 551, 553, 555, 557, 559, 561, 563, 565 and 567 when to open and close, thus initiating the flow of the fluid and stopping the flow of the fluid through the fluid control units 551, 553, 555, 557, 559, 561, 563, 565 and 567. The at least one sensor unit 501 can provide the output signals to each of the fluid control units 551, 553, 555, 557, 559, 561, 563, 565 and 567 using any suitable communication means including wireless communication means, such as radio and infrared transmitters and receivers. Where the system 500 is a garden sprinkler system, the sensor unit 501 can, for example, measure or detect moisture in surrounding soil 571. When the level of moisture detected or measured by the sensor unit 501 is below a threshold value, the sensor unit 501 provides output signals that instruct the valves of the fluid control units 551, 553, 555, 557, 559, 561, 563, 565 and 567 to open for a duration of time to water the garden and increase the moisture level in the soil. After the duration of time or when the detected or measured moisture level is above a threshold level, the sensor unit 501 provides output signals that instruct the valves of the fluid control units 551, 553, 555, 557, 559, 561, 563, 565 and 567 to close, thus stopping the flow of water through the fluid control units 551, 553, 555, 557, 559, 561, 563, 565 and 567.

As the water flows through the fluid control units 551, 553, 555, 557, 559, 561, 563, 565 and 567, the micro-generators, such as 105 (FIG. 1), generate power from the flow of the water through the fluid control units 551, 553, 555, 557, 559, 561, 563, 565 and 567. The power that is generated is stored in at least power storage unit 511 and is used to operate or power the valves of the fluid control units 551, 553, 555, 557, 559, 561, 563, 565 and 567 and/or the at least one sensor unit 501.

The system 500 can include a plurality of micro-processors 651, 653, 655, 657, 659, 661, 663, 665 and 667 with firmware or a central computer 503 with a graphical user interface to program the system 500 to operate according to any number of parameters. For example, where the system 500 is a garden sprinkler, such as described above, the central computer 503 can be used to program the duration of time that the water flows through the fluid control units 551, 553, 555, 557, 559, 561, 563, 565 and 567 when the moisture level measured or detected is below the threshold value, as well as set or program the moisture threshold value. The plurality of micro-processors 651, 653, 655, 657, 659, 661, 663, 665 and 667 and/or the central computer 503 can be used to program the operation of the system 500 in any number of ways. The system 500 can also include a memory unit 505 to store data and to monitor the operation of the system 500 and/or the conditions of the surrounding environment 571.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention as defined by the appended claims.

What is claimed is:

1. A fluid control device comprising:
    a) a sensor for sensing a condition and for generating output signals based on the condition;
    b) means to couple the fluid control device to a fluid source, wherein the means to couple to a fluid source includes threaded features configured to screw onto an end of a faucet;
    c) a valve coupled to the sensor, wherein the valve opens and closes in response to the output signals from the sensor; and
    d) a power generator for powering the sensor and the valve, wherein the power generator includes a magnetic flywheel that is positioned in a flow of liquid through the fluid control device and generates power from the flow of the fluid through the fluid control device.

2. The fluid control device of claim 1, wherein the sensor is a sensor selected from the group consisting of a photo-sensor, a thermal sensor, an electrode and a moisture sensor.

3. The fluid control device of claim 1, wherein the sensor is an occupancy sensor for sensing the presence of a person in an area corresponding to a location of the fluid control device.

4. The fluid control device of claim 1, wherein the power generator further comprises an energy storage unit coupled to the micro-generator for storing energy generated by the micro-generator.

5. A fluid control system comprising:
    a) means to couple to a fluid source, wherein the means to couple to a fluid source includes threaded features configured to screw onto an end of a faucet;

b) a sensor for sensing a condition and generating output signals;
c) valve coupled to the sensor for opening and closing in response to an output from the sensor;
d) a micro-generator that includes a magnetic fly wheel for powering at least one of the sensor and the valve, wherein the micro-generator generates power from the magnetic fly wheel as fluid flows from the fluid source and over the magnetic fly wheel and wherein the valve opens and closes in response to the output signals; and
e) a manual override switch, which is activated to allow the faucet to operate independent of the fluid control system.

6. The fluid control system of claim 5, wherein the sensor is a sensor selected from the group consisting of a photo-sensor, an occupancy sensor, a thermal sensor, an electrode and a moisture sensor.

7. The fluid control system of claim 5, further comprising a means to position a portion of the micro-generator in a flow path of the fluid source.

8. The fluid control system of claim 5, further comprising an energy storage unit coupled to the micro-generator for storing energy generated by the micro-generator.

* * * * *